Aug. 17, 1943.   L. R. BUCKENDALE   2,326,754
MULTISPEED DRIVE AXLE
Filed Oct. 3, 1941
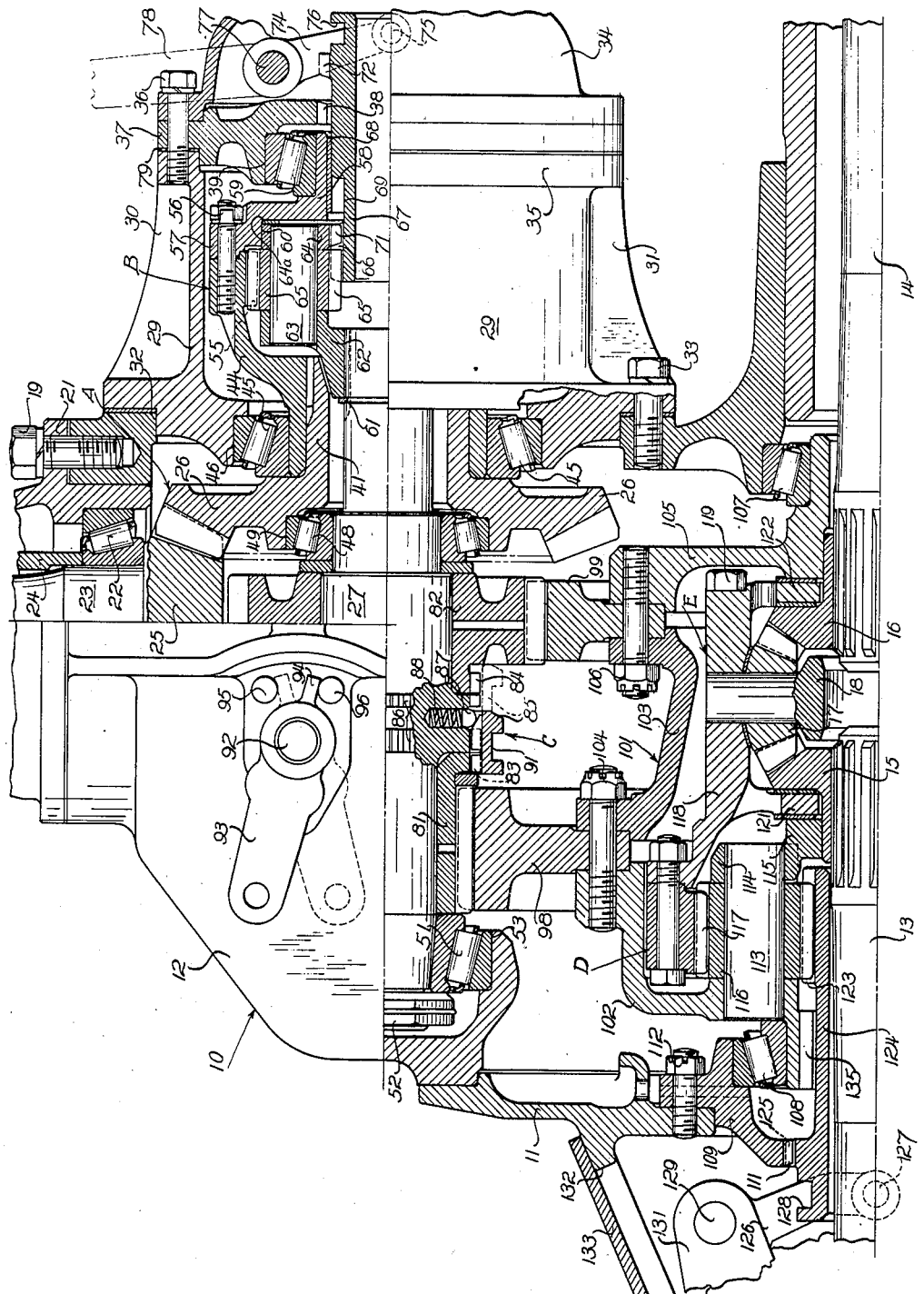
Lawrence R. Buckendale
By Strauch & Hoffman Attorneys Patented Aug. 17, 1943

2,326,754

UNITED STATES PATENT OFFICE 2,326,754

MULTISPEED DRIVE AXLE

Lawrence R. Buckendale, Detroit, Mich., assignor to The Timken-Detroit Axle Company, Detroit, Mich., a corporation of Ohio Application October 3, 1941, Serial No. 413,540

19 Claims. (Cl. 74—314)

The present invention relates to power transmitting mechanism and is particularly concerned with automotive drive axles embodying planetary gear mechanisms, although it is not limited to such use.

While planetary drive axles have been heretofore used in the bus and truck field, and in recent years have gone into limited use in pleasure cars, for securing an overdrive at the higher or cruising speeds, they have not proved altogether successful in meeting the demands of present day transportation, primarily because they do not afford a sufficient number of speed ratios to meet the various load and grade conditions encountered in normal service, particularly in the bus and truck field.

In my co-pending application Serial No. 413,539, filed October 3, 1941, for "Multispeed drive axle," I have shown a drive axle embodying a planetary unit concentrically mounted with respect to the axle shafts and driven through a two speed spur gear assembly, which, combined with the overdrive and direct drive ratios of the planetary mechanism, provides much greater flexibility than the axles now in use. The present invention also embodies an overdrive unit, but deals with a somewhat different type of axle, designed to afford all the advantages of the one of my co-pending applications and to also afford an additional planetary speed reduction.

It is the major object of this invention to provide a power transmitting mechanism comprising a primary planetary unit, a two-speed non-planetary gear assembly, and a second planetary unit, all arranged in series and operable to transmit power at a plurality of different speed ratios.

A further important object is to provide, in an axle having a countershaft and axle shafts journalled for rotation about parallel axes in a housing, and a propeller shaft disposed normal to the countershaft, a planetary gear mechanism for transmitting power between the propeller and countershafts at a plurality of speed ratios.

Another object is to provide a drive axle having a drive shaft; a countershaft and axle shafts journalled in a main housing, and a planetary gear unit contained in an auxiliary housing and operable to transmit power between the drive shaft and the countershafts at a plurality of different speed ratios.

A further object is to so design a drive axle of the countershaft type that power may either be transmitted through a pair of gears directly to the countershaft, or by journalling the drive gear upon the countershaft and mounting a planetary unit adjacent one end of the countershaft, and connecting part of the planetary unit to the countershaft and to the drive gear, power may be transmitted therebetween at a plurality of different speed ratios, without making any other changes in the axle construction.

A still further object is to provide a drive axle having a countershaft and a drive gear mounted for rotation about a common axis, with a planetary gear mechanism to one side of the gear and a multi-speed gear mechanism to the other side of the gear, for transmitting power at different speed ratios.

My invention further aims to provide a novel planetary gear mechanism, which is particularly advantageous in drive axles, although not limited to such use.

Another object is to provide a novel housing assembly for drive axles which is compact, easy to assemble and yet is extremely rugged and serviceable under all conditions to which it is subjected in use.

Further objects will become apparent as the specification proceeds in conjunction with the annexed drawing, and from the appended claims.

In the drawing, the figure is a longitudinal sectional view, taken substantially on a horizontal plane, of a vehicle drive axle embodying the invention, certain parts of the housing being shown in elevation to simplify the disclosure.

The mechanism comprises broadly a primary bevel reduction drive A, which transmits power to a planetary gear mechanism B, which in turn transmits power at two selective speed ratios to a countershaft. Power is transmitted from the countershaft selectively at two different speed ratios through a spur gear assembly C to a second planetary unit D. The latter in turn transmits power through a differential unit E, to the axle shafts selectively at two different speed ratios. Planetary unit B is an underdrive unit, while unit D is an overdrive unit, and they are shiftable into various combinations to give several speed ratios, as will be hereinafter described.

The main housing 10 is split transversely into minor and major sections 11 and 12, detachably bolted together in well known manner. Sections 11 and 12 will be hereinafter termed the main housing. Journalled in axle arms carried by the housing in well known manner are a pair of axle shafts 13 and 14, carrying differential side gears 15 and 16, respectively, which mesh with differential miter gears 17, carried by a differential spider 18, and which are preferably three or more in number, in order that they may support one end of the differential casing, as will be later described.

Power is transmitted from the propeller shaft to the axle shafts at several different selectively variable speed ratios by a novel power transmitting mechanism that will now be described.

Detachably secured to the front end of the main housing, by means of stud and nut assemblies 19, is a bearing sleeve 21 containing a front bearing (not shown) and a rear bearing 22. A pinion shaft 23 is supported in the bearings, and a spacer 24, together with shims and nuts (not shown), maintains the proper bearing clearances, in well known manner.

In the present instance I have shown shaft 23 as being provided with an integral bevel pinion 25, meshing with a bevel gear 26. It is to be understood, however, that the type of primary reduction may be varied as desired, depending upon the requirements of the installation involved. For instance, if a greater speed reduction is desired, a worm gear or other well known type of gear mechanism may be employed without departing from the spirit of the invention.

Power is transmitted from gear 26 to a countershaft 27 selectively at either a one-to-one ratio or a speed reducing ratio by a novel planetary mechanism, and the parts are so designed and correlated that it is possible to locate the planetary mechanism in an auxiliary casing exterior to the main housing, with the result that, if desired, the axle may be changed over from one in which gear 26 is rigidly connected to the countershaft, into one wherein a planetary speed reduction is provided between the gear and the shaft.

An auxiliary housing 29, having longitudinal strengthening webs 30 and 31, is detachably secured in place over an opening 32 in the main housing by means of cap screws 33. As is apparent, opening 32 is of sufficiently large diameter to permit gear 26 to be removed bodily therethrough, so that the auxiliary housing and the entire countershaft assembly may be removed bodily through the opening.

Detachably clamped between an auxiliary housing closure 34 and a housing flange 35, by means of cap screws 36, is a combined bearing race support and clutch member 37, having internal teeth 38 and a bearing seat 39, for a purpose that will presently appear.

Gear 26 is provided with a hub portion 41 which is tightly splined to a planetary mechanism cup-shaped part or element 44. By telescoping members 41 and 44 adjacent opening 32, and journalling member 44 in an anti-friction bearing 45 carried in a seat 46 in the auxiliary housing, an extremely sturdy structure is provided of minimum overall length.

The countershaft is journalled at one end in an anti-friction bearing 48 contained in a seat 49 in the bevel gear. The other end of the shaft is carried in an anti-friction bearing 51 secured to the shaft by means of a lock nut assembly 52 and supported in a closed pocket or seat 53 in the main housing.

UNDERDRIVE UNIT

By allowing the bevel gear hub and the countershaft to project through the opening in the main housing and utilizing the novel planetary mechanism to be now described, it is possible to locate the latter wholly exteriorly of the main housing.

Member 44 is of generally cup shape and is provided with internal teeth 55 which constitute the orbit gear of the system. Rigidly secured to member 44, by means of stud and nut assemblies 56, is an annular element 57 having a hub portion 58 journalled in an anti-friction bearing 59 mounted in seat 39. Members 44 and 57 are accordingly journalled for free rotation and, since they are rigidly connected together, afford adequate support for gear 26.

Splined to the projecting end of shaft 27, and restrained against endwise movement to the left by means of a split ring 61, is an annular planet-carrier or support 62. A plurality of planet shafts 63 (preferably three) are rigidly mounted in member 62 and tightly fit into openings in a ring 64. Ring 64 and member 62 are provided with matching bosses at spaced points intermediate shafts 63, and are rigidly secured together in well known manner (not shown). Ring 64 is journalled in a cylindrical recess 60 in member 57, thereby affording additional support for the planet carrier. A washer 64a prevents endwise float of ring 64 and member 62 to the right.

Mounted on each shaft 63 is a planet gear 65, which constantly meshes with internal gear 55, and sun gear teeth 66 provided on a sleeve or quill member 67. The quill is mounted for rotational and axial sliding movement in a bushing 68 in the hub 58 of member 56, and as seen a large groove 69 is provided between the ends of the sun gear teeth and the body of the quill.

The sun gear teeth are also adapted to be alternatively meshed with a set of internal teeth 71 provided in ring 64, for locking the planets against rotation about their axes. The quill is also provided with a plurality of external teeth 72, which are adapted to be meshed with teeth 38 of member 37.

The quill is adapted to be shifted axially by a yoke member 74 having a pair of pins 75 seating in a groove 76 in the quill. Yoke 74 is carried by a shaft 77, and the latter is adapted to be rocked by a lever 78 mounted on the shaft exteriorly of the housing.

From the foregoing it is apparent that, by removing screws 36, closure 34 may be removed altogether, carrying with it the yoke mechanism and, if desired, the quill also may be slid out of the unit for service or replacement. Also, member 37 may be removed from the unit, to give access to the planet underdrive mechanism. Upon reassembly of the parts, a number of shims 79 may be interposed between member 37 and the auxiliary housing, to give the proper bearing adjustment.

Operation

Assuming that the parts are in the position shown in the drawing, with the quill in its right-hand position, and shaft 23 is rotated, pinion 25 will drive gear 26 at a reduced ratio, the reduction depending upon the number of teeth in each gear. Rotation of gear 26 effects unitary rotation of members 44 and 57 and the internal gear teeth 55.

Under the conditions just described, sun gear teeth 66 are meshed with both the teeth of planet gears 65 and the internal teeth on the carrier, with the result that ring 64 is rigidly locked to quill 67, and planets 65 are locked against rotation about their axes. Therefore, rotation of member 44 results in bodily synchronous rotation of planets 65, members 62 and 64 and quill 67 and this in turn effects synchronous rotation of countershaft 27. The countershaft is accordingly driven at the same speed as gear 26, and the parts are in direct drive or in a one-to-one power transmitting ratio.

Assuming now that the quill is shifted to the left sufficiently to disengage front gear teeth 66 from teeth 71, the planets 65 are now free to rotate about their axes but no power is transmitted through to the mechanism under these conditions because teeth 71 merely idle in groove 69 of the quill, and the quill merely undergoes free rotation. The unit is accordingly in neutral.

When the quill is shifted into its extreme left-hand position, so as to engage teeth 72 thereof with stationary teeth 38, the quill is locked against rotation and the unit is in underdrive ratio. Under these conditions, rotation of member 44 causes internal gear 55 to roll or planetate planet gear 65 about stationary sun gear teeth 66. The resulting rotation of shafts 63, at a speed slower than the rotationary speed of member 44, causes the countershaft 27 to be driven at a reduced speed or through so-called "underdrive."

It should be particularly observed that, since the planetary underdrive unit is located outside of the main housing, the axle may be changed over to omit the underdrive unit by replacing auxiliary housing 29 by a closure cap having a bearing supporting the gear and countershaft and by using a modified countershaft which is rigidly secured to gear 26.

In my co-pending application for "Multispeed drive axle," Serial No. 413,539, filed October 3, 1941, the present axle is shown as it appears when changed over to omit the underdrive unit, and in my co-pending application Serial No. 413,538, for "Multispeed drive axle," filed October 3, 1941, there is shown a somewhat similar assembly, but modified to embody but a single spur gear reduction. The modified construction is accordingly not claimed in the present application.

It is also to be understood that, although hub portion 41 is shown as being telescoped within member 44, the relationship may be reversed if desired and portion 44 telescoped within member 44 without departing from the spirit of the invention. The important feature of the invention resides in the telescoping of the two members, and supporting them adjacent the opening in the main housing by means of a bearing surrounding their telescoped portions. It is also to be understood that, although I prefer to employ an underdrive unit for transmitting power between gear 26 and shaft 27, many of the novel features of the invention are not limited thereto and are just as advantageous in a planetary overdrive. It is therefore to be understood that the appended claims which are not limited to an underdrive are intended to embrace both underdrive and overdrive planetary mechanisms.

Spur Gear Reduction

The secondary two speed unit has been illustrated as a spur gear assembly, comprising a low speed gear 81 and a high speed gear 82 mounted for free rotation on the countershaft, and having clutch teeth 83 and 84, respectively. A toothed clutch 85, coacting with teeth 86 on the countershaft, may be shifted either into engagement with clutch teeth 83 of clutch teeth 84, to selectively couple the gears to the shaft, and it is adapted to be yieldingly held in shifted position by means of a ball detent 87 resiliently urged outwardly by means of a spring 88, against chamfered clutch teeth on the collar.

Coacting with a groove 91 in clutch collar 85 is a yoke assembly (not shown) carried by a shaft 92. Secured to shaft 92 is an actuating lever 93, having a finger 94 coacting with stop pins 95 and 96 on the main housing. The specific two speed spur gear reduction assembly shown is more specifically disclosed in the co-pending application of Nelson R. Brownyer, Serial No. 387,977, filed April 10, 1941, and will not be further described, it being understood that the easy shift feature of the Brownyer invention may also be applied to the quills in both the overdrive and underdrive unit.

Gears 81 and 82 mesh respectively with spur gears 98 and 99 carried by a planetary housing assembly denoted generally by the reference character 101.

Operation

With lever 93 disposed in a position shown, clutch 85 is disposed in engagement with clutch teeth 83 of gear 81, thereby locking the gear and shaft for synchronous rotation, and transmitting the drive from the countershaft to gear 98 in the low speed ratio. By shifting lever 93 into the dotted line position, clutch member 85 is brought into mesh with teeth 84, thereby locking gear 82 to the countershaft. The countershaft accordingly drives high speed gear 82, and the latter transmits the drive through gear 99 and rotates casing 101 in the high speed ratio.

Over Drive Unit

Spur gears 98 and 99 are rigidly secured to, and form part of, a sectional housing 101 made up of a cup-shaped member 102, secured to a central member 103 by means of stud and nut assemblies 104 and clamping the web of gear 98 between them. A third casing member 105 is secured to central member 103 by means of stud and nut assemblies 106 and the two sections clamp the web of gear 99 firmly between them.

One end of casing 101 is journalled in a bearing 107 in the main housing, and the other end of the casing is journalled in a bearing 108 carried by a member 109 having internal clutch teeth 111 and secured to an inwardly projecting web in the main housing by means of stud and nut assemblies 112. Gears 98 and 99, and the casing to which they are secured, are accordingly mounted for free rotation and restrained against axial displacement.

Power is transmitted from the casing to a plurality of planet shafts 113 mounted in section 102 and in a ring member 114 rigidly secured to the latter. The hub of side gear 15 is journalled in a hub portion 115 provided on ring member 114, while slide gear 16 is journalled directly in casing section 105. Shafts 113 carry planet gears 116 which constantly mesh with a ring gear 117 which is bolted to a differential casing 118. The latter is split transversely in well known manner to facilitate installation and removal of the differential, the parts being held together by cap screws 119. The differential casing is provided with inwardly extending web-like portions 121 and 122, having thrust washers cooperating with the backs of side gears 15 and 16 respectively, and also with ring 115 and the hub of rotor section 105, to limit endwise movement of casing 118.

From the foregoing it is apparent that planet shafts 113 are mounted for planetation about the common axis of the axle shafts and casing 101. The differential casing is mounted for rotation on the pitch lines of planet gears 116 at one end by means of internal gear 117, and upon the pitch lines of side gears 15 and 16 at the other, by means of miter gears 17. The planet gears also constantly mesh with sun gear teeth 123 provided on a sleeve or quill member 124, the latter being mounted for rotation on the pitch lines of gears 116 and adapted to undergo axial sliding movement. A second set of external teeth 125 on the quill are adapted to be meshed with internal teeth 111 on stationary support 109.

The quill is adapted to be shifted longitudinally by means of a yoke 126 having pins 127 riding in a recess 128 adjacent the end of the quill. The yoke is rigidly mounted on a shaft 129, and a lever 131 is secured to the shaft exteriorly of the housing for rocking the shaft into its various operative positions. An opening 132, adapted to be closed by a closure 133, affords access to the shifting mechanism.

The mechanism may be lubricated in the manner shown in my co-pending application Serial No. 413,537, for "Multispeed drive axle," filed of even date herewith.

*Operation*

With casing 101 being rotated by either gear 98 or gear 99, and with the quill in the shifted position illustrated, quill teeth 125 engage stationary teeth 111 and lock the quill against rotation. The translation of planet shafts 113 about the axes of the axle shafts accordingly causes planets 116 to roll or planetate around the stationary sun gear, with the result that they rotate internal gear 117 and casing 118 at a higher speed than casing 101. The parts are accordingly driven in an overdrive ratio, the resultant speed depending upon the respective sizes of the sun, planet, and orbit or ring gears, it being understood that the gear sizes will be chosen to suit the requirements of the particular drive in which the mechanism is to be used.

When the quill is shifted to the left, sufficiently to disengage teeth 125 from teeth 111, but short of engaging teeth 135 provided in the hub of casing section 102, no power is transmitted, because the quill is free to rotate in response to any rotation of the planet gears resulting from their engagement with the internal gear. The device is accordingly in neutral under these conditions.

When the quill is shifted into its extreme left-hand position, so as to engage teeth 123 with teeth 135, the sun gear is meshed with both the planet carrier 102 and the planets, with the result that the latter are locked against rotation about their axes. Under these conditions rotation of casing 101 results in synchronous rotation of casing 118, through the intermediary of casing section 102, locked planets 116 and internal gear 117. This is the direct drive or one-to-one driving ratio of the mechanism.

From the foregoing detailed disclosure of the invention it is apparent that the drive mechanism provides three separate two-speed mechanisms connected in series, the first unit being the underdrive planetary mechanism, the second unit being the two-speed spur gear drive, and the third the planetary overdrive. By shifting the mechanisms in various combinations, eight different speeds may be obtained. For instance, the underdrive units may be placed in either underdrive or direct driving positions, the spur gear unit may be placed in either high or low gear driving position, and the overdrive unit placed in either overdrive or direct drive position. Eight different combinations are possible with the mechanism, and any desired form of control mechanism may be used. For instance, a separate actuator may be provided in the vehicle cab for operating each mechanism at will to provide the desired great reduction, or if desired, a combination control mechanism, correlating the operation of the units in any desired manner, may be employed without departing from the spirit of the invention.

The mechanism may be readily disassembled for service or replacement of parts by separating the two sections of the main housing and then removing the auxiliary housing and associated parts. Upon removal of the axle shafts and separation of housing section 11 from section 12, casing assembly 102 may be slid to the left and disengaged from the outer race of bearing 107 and removed from the housing. The shifter fork shaft 92 is now removed. Screws 33 may then be removed and auxiliary housing 29 slid to the right, carrying the entire underdrive planetary unit and spur and bevel gear assembly and the countershaft with it. The planetary underdrive and overdrive units may then be disassembled by separating the component parts of their casings, as will be readily apparent. If desired the pinion shaft and bearing assembly may be removed either before or after the operations just described by removing nuts 19 and sliding the unit forwardly out of housing section 12.

Although I have disclosed the invention as being embodied in an axle having a transversely split housing, it is to be understood that the invention is also applicable to carrier type constructions embodying a one-piece axle housing having a bolted-on carrier supporting the rotor and all the gear mechanisms, and the appended claims are intended to embrace the invention when it assumes this form. Also, release of the vehicle clutch is contemplated during shifting of the planetary units, but it is to be understood that if the easy shift feature of the aforementioned Brownyer application is incorporated therein, it is unnecessary to interrupt the connection to the prime mover.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive axle, a housing; axle shaft means journalled in said axle housing; a countershaft disposed substantially parallel to said axle shaft means; a drive gear mounted for rotation about the axis of said countershaft; planetary gear mechanism for transmitting power from said drive gear to said counter shaft at two different speed ratios; and second and third gear mechanisms and a final drive device for transmitting power from said countershaft to said axle shaft means at several different speed ratios, the latter being disposed at one side of said drive gear and said planetary gear mechanism being disposed to the other side thereof, said third gear mechanism comprising a second planetary gear mechnism located in a rotor mounted for rotation in said housing about the axis of said axle shaft means.

2. In a multi-speed drive axle, a housing having axle shafts journalled therein; a drive gear and a countershaft journalled for rotation about a common axis disposed substantially parallel to said axle shafts; a planetary gear mechanism for transmitting power from said drive gear to said countershaft selectively at two different speed ratios; a structure mounted for rotation about the axis of said axle shafts; a spur gear mechanism for selectively transmitting power from said countershaft to said structure at two different speed ratios; and a second planetary gear mechanism for transmitting power from said structure to said axle shafts selectively at two different speed ratios.

3. The axle construction defined in claim 2, wherein said second planetary gear mechanism and said spur gear mechanism are located in said housing, and said first planetary gear mechanism is located in an auxiliary casing secured to said housing adjacent one end of said countershaft and in alignment therewith.

4. In a multi-speed drive axle, a housing having aligned axle shafts journalled therein; a drive gear and a countershaft journalled for rotation about a common axis disposed substantially parallel to said axle shafts; a planetary underdrive gear mechanism for transmitting power from said drive gear to said countershaft selectively at either a speed reducing ratio or a one-to-one speed ratio; a structure mounted for rotation about the axis of said axle shafts; a spur gear mechanism for selectively transmitting power from said countershaft to said structure at two different speed ratios; and a plantary overdrive gear mechanism for transmitting power from said structure to said axle shafts selectively at either a speed increasing ratio or a one-to-one speed ratio.

5. In a power transmitting mechanism, a housing, a drive gear mounted for rotation in said housing, and adapted to have power applied thereto; a countershaft journalled within said gear for rotation about a common axis, said gear and shaft each projecting axially through an opening in said housing into an auxiliary gear chamber; and a planetary gear mechanism, including a planet carrier and an orbit gear, disposed in said auxiliary gear chamber and connected to the projecting portions of said drive gear and countershaft, operable to selectively transmit power at several different speed ratios.

6. The power transmitting mechanism defined in claim 5, wherein said planet carrier is connected to said countershaft and said orbit gear is connected to said drive gear, and said planetary mechanism is operable in one selected ratio, to transmit power to said countershaft at a speed reduction, and in the other ratio to transmit power in a one-to-one drive.

7. In a power transmitting mechanism, a housing; a drive gear mounted for rotation in said housing, and adapted to have power applied thereto; a countershaft journalled within said gear for rotation about a common axis, said gear and shaft each projecting axially through an opening in said housing into an auxiliary gear chamber; a casing-like structure rigidly connected to the projecting portion of said drive gear and disposed in said auxiliary gear chamber in alignment with the axis of said drive gear and countershaft; bearing means in said auxiliary gear chamber for journalling the end of said structure remote from said drive gear; a planetary gear mechanism, including a planet carrier disposed in said casing-like structure and connected to the projecting portion of said countershaft, and operable to selectively transmit power at several different speed ratios; and means for detachably securing said auxiliary gear chamber over the opening in said housing, said opening being of sufficiently large diameter to permit said drive gear to pass therethrough when said auxiliary gear chamber and housing are disassembled.

8. In a power transmitting mechanism, a housing, a drive gear mounted for rotation in said housing, and adapted to have power applied thereto; a countershaft journalled within said gear for rotation about a common axis; said gear and shaft each projecting axially through an opening in said housing into an auxiliary gear chamber; a casing-like structure in said auxiliary gear chamber having a central enlarged orbit gear portion and reduced end portions; means for rigidly securing one of said reduced end portions to the projecting portion of said gear; means for journalling the other reduced end portion in said auxiliary gear chamber; and a planetary gear mechanism, including a planet carrier disposed in said auxiliary gear chamber and connected to the projecting portion of said countershaft having planet gears meshing with the orbit gear portion of said structure, operable to selectively transmit power at several different speed ratios.

9. In a drive axle, a primary housing; axle shafts journalled in said housing; a countershaft disposed substantially parallel to said axle shafts in said housing; a drive gear located adjacent one wall of said housing; said one wall of said housing having an opening sufficiently large to permit removal of said gear therethrough; a secondary housing fitting over said opening and detachably secured to said primary housing; anti-friction bearing means adjacent said opening supporting said countershaft and said drive gear for independent rotation about a common axis; gear mechanism in said secondary housing for selectively transmitting power between said drive gear and countershaft at two different speed ratios; and means for transmitting power from said countershaft to said axle shafts.

10. In a drive axle, a primary housing; axle shafts journalled in said housing; a countershaft disposed substantially parallel to said axle shafts in said housings; a drive gear located adjacent one wall of said housing; said one wall of said housing having an opening sufficiently large to permit removal of said gear therethrough; a secondary housing fitting over said opening and detachably secured to said housing, a planetary mechanism member tightly secured in telescoping relationship to said drive gear and projecting into said secondary housing; anti-friction bearing means supporting the telescoped portions of said drive gear and member; and second bearing means supporting one end of said countershaft in said drive gear; a third bearing means supporting the other end of said countershaft in said primary housing; gear mechanism in said secondary housing for selectively transmitting power between said drive gear and countershaft at two different speed ratios; and means for transmitting power from said countershaft to said axle shafts.

11. In a drive axle, a main housing having an opening in one wall thereof; an open-ended auxiliary housing detachably secured over the opening in said main housing; a closure assembly detachably secured over the open end of said auxiliary housing; a drive gear in said main housing and a planetary gear element in said auxiliary housing having hub portions telescoped one within the other adjacent the opening in said main housing; means provided on said auxiliary housing journalling the telescoped portions of said drive gear and planetary gear element for synchronous rotation; and a countershaft journalled at one end in said drive gear and at the other end in said main housing.

12. In a drive axle, a main housing having an opening in one wall thereof; an open-ended auxiliary housing detachably secured over the opening in said main housing; a closure assembly detachably secured over the open end of said auxiliary housing; a drive gear in said main housing and a planetary gear element in said auxiliary housing, having axially directed hub portions, the hub portion of said drive gear being telescoped within the hub portion of said element adjacent the opening in said main housing; bearing means provided on said auxiliary housing journalling the hub portions of said planetary gear element for rotation, said planetary gear element having a second hub portion; and anti-friction bearing means mounting the second hub portion for rotation in said closure assembly; and a countershaft journalled at one end in said drive gear and at the other end in said main housing.

13. In a drive axle, a main housing having an opening in one wall thereof; an open-ended auxiliary housing detachably secured over the opening in said main housing; a closure assembly detachably secured over the open end of said auxiliary housing; a drive gear in said main housing and a planetary gear mechanism, including an element in said auxiliary housing connected together for synchronous rotation; means provided on said auxiliary housing journalling said drive gear and planetary gear element; a countershaft journalled at one end in said drive gear and at the other end in said main housing; and having a portion projecting into said auxiliary housing; planetary gear mechanism in said auxiliary housing for transmitting power between said planetary gear element and said countershaft; and means in said closure assembly for selectively shifting said planetary gear mechanism to drive said countershaft at different gear ratios.

14. The axle construction defined in claim 13, wherein said closure assembly also comprises a member carrying bearing means journalling one end of said planetary gear element in said auxiliary housing.

15. The axle construction defined in claim 13, wherein said closure also comprises a member rigidly connected to said auxiliary housing and having internal teeth adapted to lock a part of said planetary gear mechanism against rotation.

16. In a power transmitting mechanism, an open-ended housing; a planetary gear mechanism disposed in said housing, comprising a rotor having reduced end portions, bearing means for supporting one end of said rotor; a ring-like member secured to the open end of said housing and having bearing means supporting the other end of said rotor; a closure member fitting over said ring-like member and closing the open end of said housing, one of said members having internal teeth; an axially slidable control element having teeth coacting with said internal teeth; and actuating means for said control means carried by said closure member.

17. The power transmitting mechanism defined in claim 16, wherein said internal teeth are provided on said ring-like member and coact with a toothed sleeve member mounted for rotational and axial sliding movement and operably connected to said planetary gear mechanism.

18. In a drive axle, a main housing having opposed axle arms carrying aligned axle shafts; said housing being split on a plane normal to said axle shafts into a major section and a minor section; a countershaft disposed substantially parallel to said axle shafts in said major section; a closed-ended recess in said major section adjacent said minor section having a bearing supporting one end of said countershaft, the opposite wall of said major section having an opening through which said countershaft projects; means in said opening for rotatably supporting the projecting end of said countershaft; a drive shaft mounted for rotation in said major section substantially normal to said countershaft; a rotor journalled at one end in said major section and at the other end in said minor section for rotation about the axis of said axle shafts, whereby said rotor may be removed upon separation of said sections; and gear means for transmitting power between said drive shaft, said countershaft and said axle shafts.

19. The axle construction defined in claim 18, wherein said gear means includes a planetary gear mechanism in said rotor and adapted to transmit power selectively at two different speed ratios, and said minor housing section contains control means for said mechanism.

LAWRENCE R. BUCKENDALE.